United States Patent [19]

Evans

[11] Patent Number: 4,579,897

[45] Date of Patent: Apr. 1, 1986

[54] AQUEOUS EMULSIONS OF HIGH SOFTENING POINT HYDROCARBON RESINS AND PROCESS FOR PREPARING THE SAME

[75] Inventor: Morris L. Evans, Baton Rouge, La.

[73] Assignee: Exxon Research & Engineering Co., Florham Park, N.J.

[21] Appl. No.: 666,934

[22] Filed: Oct. 31, 1984

[51] Int. Cl.$^4$ .......................... C08K 5/41; C08K 5/42
[52] U.S. Cl. .................................. 524/155; 524/158; 524/375; 524/475
[58] Field of Search ............... 524/155, 158, 375, 475

[56] References Cited

U.S. PATENT DOCUMENTS 3,211,683  10/1965  Arakawa et al. .................. 524/499
4,414,346  11/1983  Jagisch et al. ..................... 524/375

Primary Examiner—Paul R. Michl
Assistant Examiner—N. Sarofim
Attorney, Agent, or Firm—B. C. Cadenhead

[57] ABSTRACT

A resin aqueous emulsion of a petroleum resin blend having a softening point of less than 85° C. of a resin having a high softening point of at least 90° C. and a resin having a low softening point is realized by utilizing from 3 to 10 parts by weight of an emulsifier consisting essentially of the class nonyl phenol alkoxylated with 10-12 moles of ethylene oxide per mole of nonyl phenol, anionic alkyl aryl sulfonate and mixtures thereof and dispersing a portion of the water as hot water in said blend prior to inversion into said emulsion.

4 Claims, No Drawings

AQUEOUS EMULSIONS OF HIGH SOFTENING POINT HYDROCARBON RESINS AND PROCESS FOR PREPARING THE SAME

This invention relates to emulsions of hydrocarbon resins and more particularly to aqueous emulsions of high softening point resins prepared from steam-cracked petroleum fractions.

BACKGROUND OF THE INVENTION

Many synthetic resins which may be formed by emulsion polymerization are well known in the art. It is not difficult to form stable aqueous dispersions of such resins by addition of the resin feed an appropriate dispersing agent and catalyst to water with stirring. However, emulsification of resins produced by other polymerization techniques require that the bulk polymer must be dispersed in water to obtain an aqueous dispersion. Such a type is the hydrocarbon resins produced from steam-cracked petroleum fractions.

These hydrocarbon resins, i.e. petroleum resins, are defined herein as the thermoplastic resins obtained by polymerization, in the presence of a catalyst of the Friedel-Crafts type, of steam cracked petroleum distillates, boiling in the range between about 30° and 280° C., or any fraction of these distillates boiling within the said range, or of mixtures of olefins and diolefins containing sufficient diolefins to obtain a resin and not an oil or a rubbery material. This polymerization is performed at temperatures which range generally from 0° to 70° C., and for preference from 30° C. to 55° C.

These resins are polydienic in character and generally have a ring and ball softening point between about 0° C. and 180° C.

Since these resins are solid at room temperature numerous approaches have been utilized to produce aqueous emulsions of said resins for application as an adhesive, as a saturant or coating for paper or cloth or as a sizing or binding material in paper pulp.

One approach was to solvate the resin in hydrocarbon solvent and then combine resin solution and water. Invariably some residual hydrocarbon solvent remains in the finished emulsion, and this is undesirable in certain applications. This has led to the development of solvent-free dispersions (see U.S. Pat. No. 2,809,948) and emulsions (see U.S. Pat. No. 3,377,298) of petroleum resins. In both of these formulations, ionic emulsifiers have been utilized; in the former a mixture of cationic and non-ionic surface active agents is used to achieve a resin dispersion; and, in the latter an ionic surfactant is used in combination with an aqueous gel of a swelling earth to produce an emulsion paste of a petroleum resin.

Petroleum resin emulsions containing a large portion (10 to 70%) of diluents such as linseed oil and waxes and paraffins are taught in French Pat. No. 1,452,875 and German Offen. No. 2014652 respectively. However, such large percentages of diluent can materially modify, not always favorably, the properties of the base resin.

The emulsion pressure sensitive adhesives desirably should be derived in part from aqueous emulsions of tackifying resins, i.e. that resin which enhances the adhesive properties of a polymer system used as the adhesive. The tackifying resins include the herein defined petroleum resins. For a general discussion of the foregoing (including its commercial aspects) see the published talk entitled Resin Dispersions for Water Based Pressure Sensitive Adhesives by Robert W. Wherry and presented at The Pressure Sensitive Tape Council Seminar on Water Based PSA Systems in June of 1979.

The invention has for one of its objects the provision of aqueous dispersions of hydrocarbon resins of high shelf and mechanical stability.

A further object is to provide petroleum resins in the form of a latex-like dispersion for application as a pressure sensitive adhesive, as a saturant or coating for paper or cloth, or as a sizing or binding material in paper pulp.

SUMMARY OF THE INVENTION

It has been discovered that an aqueous emulsion of a petroleum resin having a ring and ball softening point of greater than 90° C. can be realized when about 47.5 parts by weight of a blend of said resin and a resin having a softening point less than 80° C. is melt blended with about 2.5 parts by weight of an emulsifier comprised of a polyoxyethylene nonyl phenol ether and thereafter admixed with about 50 weight parts of water. The aqueous resin emulsion of the blended resins was made possible by initially slowly adding and dispersing with vigorous stirring boiling water in said melted blend of resins and emulsifier over a critical time period prior to inversion of the dispersion.

Thus in accordance with the objects of this invention there is provided an aqueous emulsion of a blend of a hydrocarbon resin having a ring and ball softening point of at least 90° C., preferably 95° C. to 125° C. and a hydrocarbon resin having a softening point less than 80° C. comprising from 3 to 10 parts by weight of an emulsifier of the class of nonionic polyoxyethylene nonyl phenol ether, anionic alkyl aryl sulfonate and mixtures thereof from 90 to 97 parts by weight of said blend of hydrocarbon resins having a softening point less than 85° C. and the balance being water.

This emulsion has been realized by admixture of a blend suitable for providing an aqueous emulsion of a hydrocarbon resin having a ring and ball softening point of at least 90° C. comprising from 3 to 10 parts by weight of an emulsifier of the class of nonionic polyoxyethylene nonyl phenol ether, anionic alkyl aryl sulfonate and mixtures thereof blended with 90 to 97 parts by weight of a hydrocarbon resin blend, said admixture having a ring and ball softening point less than 85° C. with water through an inversion emulsification method.

According to the invention there is also taught herein a method for the production of hydrocarbon resins in water emulsion comprising the sequential steps of admixing from 3 to 10 parts by weight of an emulsifier of the class consisting of nonionic polyoxyethylene nonyl phenol ether, anionic alky aryl sulfonate and mixtures thereof with from 90 to 97 parts by weight of a molten hydrocarbon resin blend having a ball and ring softening point of less than 85° C. heating said admixture to about 120° C., slowly adding water heated to about 100° C. to said heated admixture with vigorous stirring over a critical minimum time period and until inversion occurs, add sufficient additional water with agitation to provide an aqueous emulsion containing from 30 to 75 parts by weight water in the finished emulsion and thereafter cool to a temperature less than about 20° C. below the softening point of the mixture of emulsifier and resins prior to terminating agitation.

DETAILED DESCRIPTION OF THE INVENTION

As earlier noted, the hydrocarbon resins surprisingly emulsified according to this invention are preferably petroleum resins prepared by homo and copolymerization of olefins, diolefins and aromatic components from distillates of cracked petroleum stocks. A Friedel-Crafts catalyst is typically employed. The resulting resins may have aliphatic, aromatic or mixed aliphatic-aromatic character with a ring and ball softening point of at least 90° C.

Broadly the hydrocarbon resins are polymerized from petroleum cracked distillates boiling in the range of about 30° C. to 280° C. or any fraction boiling with this range. The resins are prepared by treating the distillate with 0.25-2.5% of a Friedel-Crafts type catalyst such as aluminum chloride, aluminum bromide, boron trifluoride, and the like or solutions, slurries, or complexes thereof. The reactions are conducted at temperatures in the range of 0°14 70° C., and preferably 30°-55° C. Residual catalyst is quenched by suitable methods such as addition or methyl alcohol and subsequent filtration, water and/or caustic washing. The final solution is then stripped of unreacted hydrocarbons and low molecular weight oils by vacuum or steam distillation. In place of the petroleum cracked distillates, the feed to polymerization may consist of mixtures of diolefins with olefins.

The emulsifiers which have been found useful for producing the emulsions of the invention are nonionic emulsifiers or combinations of a nonionic emulsifier with an anionic emulsifier. The nonionic emulsifier found useful in the invention are those which are alkylated phenols in which the alkyl group contains about 9 carbon atoms and are alkoxylated with from 8 to 14, preferably 10-12, moles of ethylene oxide per mole of alkyl phenol. Suitable anionic emulsifiers are the alkyl aryl sulphonates which are generally the alkali metal salts to make them water soluble. Highly useful for the practice of this invention is the sodium salt of docecylbenzyl sulfonic acid.

Thus, in summary the emulsions of blends of resins of the invention have a concentration of resins ranging from 67.9 to 27.3 by weight; emulsifiers ranging from 1.0 to 2.7%; water content of the resin emulsion ranging from 30 to 75% by weight, all percent by weight being determined on the total weight of the resins emulsion.

Non-reactive additives may be used in the emulsion of this invention; for example, pigments, dyes and labeling agents.

This invention also contemplates a method for the production of hydrocarbon resins in water emulsion comprising the sequential steps of admixing preferably by shearing agitation from 3 to 10, preferably 4 to 6 parts by weight of an emulsifier of the class consisting of nonionic polyoxyethylene nonyl phenol ether or anionic alkyl aryl sulfonate and mixtures thereof with from 90 to 97 parts by weight of a molten blend of hydrocarbon, preferably petroleum resins having a ring and ball softening point less than 85° C., heating said admixture to about 120° C., slowly adding water heated to about 100° C. to said heated admixture with vigorous, high shear agitation over a critical time period, adding sufficient additional water with agitation to provide an aqueous emulsion containing from 30 to 75 parts by weight water and thereafter cooling to a temperature less than about 20° C. below the softening point of the mixture of emulsifier and resin prior to terminating agitation.

In the mixing procedure which has been detailed above, there appear to be certain critical aspects to this procedure which are hereinafter indicated. The mixing procedure involves, as indicated, the heating of the resin blend to a molten state. Thereafter, the emulsifier is added to the molten blend at a temperature of approximately 105° C. This molten mix must be blended thoroughly to assure homogeneity. During this blending the admixture temperature is increased somewhat after which water at approximately 100° C. is metered into the admixture. Water addition can tend to reduce the temperature of the mixture. It is imperative that the temperature remain above the softening point of the resin-emulsifier softening point, typically a minimum of 5° C. to 10° C. above, at all times prior to inversion. Further, impeller rotational speed must be high (e.g. 550-400 rpm in a one liter laboratory unit) to ensure that the molten resins surface is continuously agitated and folded into the mix. During this time a water and oil emulsion is being obtained.

When approximately ⅓ of the water addition is complete, it is highly desirable to terminate water addition for from 5 to 10 minutes while continuing vigorous agitation. It is essential that the critical time interval from first water addition to inversion be governed by short lapses in water addition in this manner. Such lapses are also useful to maintain mix temperature, the importance of which was emphasized in the paragraph above.

Mention has been made of the criticality of the time interval from first water addition to the point of emulsion inversion from water in oil to oil in water. Laboratory and plant data indicate that for a given resin there is a mix time minimum, below which final resin emulsion particle size will be undesirably large. This critical mix time is dependent upon the power input to the mixture per unit volume of emulsion. Power input is directly related to impeller diameter and impeller rotational speed. This critical time interval can range from approximately 20 to 30 minutes in a small laboratory batch prepared employing the aforementioned very high impeller speeds to 2 plus hours in larger, plant units. It is within the skill of the art to determine the critical time and agitation requirement here for particular cases.

Following inversion it is desirable to reduce the vigorous nature of the stirring to a slow stirring to minimize foam and to terminate batch heating. Water should now be added to the emulsion mix at a temperature materially reduced below boiling and continued until the desired solids level is obtained. The stirring is continued at ambient temperatures for from 5 to 10 minutes after completion of the water addition. Prior to terminating the stirring, the emulsion temperature must be reduced to a temperature of at least 20° C. below the resinemulsifier softening point in order to prevent particle size growth or skin development in the emulsion system.

The aforementioned critical steps are vital to achieve excellent low particle size and the exceptional, unique stability exhibited by these hydrocarbon resin emulsions.

The example set forth below illustrates one embodiment of the invention and is not to be construed as limiting in any manner.

EXAMPLE 1

Hydrocarbon resin prepared from feed having a boiling range between about 30° C. and 200° C. and a ring and ball softening point of about 60° C. is blended with a hydrocarbon resin prepared with feed having a boiling range between about 100° C. and 280° C. and having a softening point of 115° C. in a 70/30 ratio. The emulsifier used in the emulsification of this resin blend was an ethoxylated nonylphenol having 12 moles of ethylene oxide per mole of nonylphenol. This blend of resin was emulsified according to the procedure given below:

Heat 250 grams of the blend of resins to a molten state in a 500 ml resin flask with a stirrer;

Add 12.5 grams of an emulsifier to the molten resins (approximately 120° C.) and blend thoroughly;

Maintain the resins at about 95° C. and begin metering in 100° C. water at an addition rate of about 5 ml/min with a continuous fast stirring at a speed of 500–600 rpm to ensure the resins surface is continuously agitated and folded into the mix;

Monitor and control the temperature to a minimum of 85° C. and preferably between 90° and 95° C.;

After inversion, turn off heat and increase the water addition rate; and,

After the water addition is complete, the emulsion is stirred 5 more minutes and cooled to about 30° C. The amount of water added can range in amounts to provide a solids content of 5 to 70 percent.

The emulsion produced had a resin concentration of 65.8% and an average solids particle size less than 5 microns.

It will be apparent from the foregoing that, while predicted forms of the invention have been illustrated and described, various modifications can be made without parting from the spirit and scope of the invention. Accordingly it is not intended that the invention be limited except by the appended claims.

What is claimed is:

1. A blend suitable for providing an aqueous emulsion of a petroleum resin having a ring and ball softening point of at least 90° C. consisting essentially of from 3 to 10 parts by weight of an emulsifier of the class of nonyl phenol alkoxylated with 10–12 moles of ethylene oxide per mole of nonyl phenol, anionic alkyl aryl sulfonate and mixtures thereof blended with a mixture of from 90 to 97 parts by weight of a blend of petroleum resins including a proportion of a petroleum resin having a softening point of at least 90° C., said blend having a ring and ball softening point of less than 85° C.

2. A blend according to claim 1 wherein said emulsifier is present in from 4 to 6 parts by weight and said blend of resins comprises a proportion of a resin having a softening point of about 125° C. and an amount of resin having a softening point less than about 80° C. whereby said blend has a softening point of less than 85° C.

3. A blend according to claim 2 wherein said emulsifier is present in about 5 parts by weight, and said resin has a softening point of from 95° C. to 125° C. and is present in about 50 parts by weight.

4. An aqueous emulsion of a petroleum resin having a ring and ball softening point of at least 90° C. consisting essentially of from 3 to 10 parts by weight of an emulsifier of the class of nonyl phenol alkoxylated with 10–12 moles of ethylene oxide per mole of nonyl phenol, anionic alkyl aryl sulfonate and mixtures thereof and from 90 to 97 parts by weight of a blend of petroleum resins containing said petroleum resin and having a softening point of less than 85° C. and the balance being water.

* * * * *